J. DICKSON.
GARDEN RAKE.
APPLICATION FILED MAY 27, 1912.
1,050,721.
Patented Jan. 14, 1913.
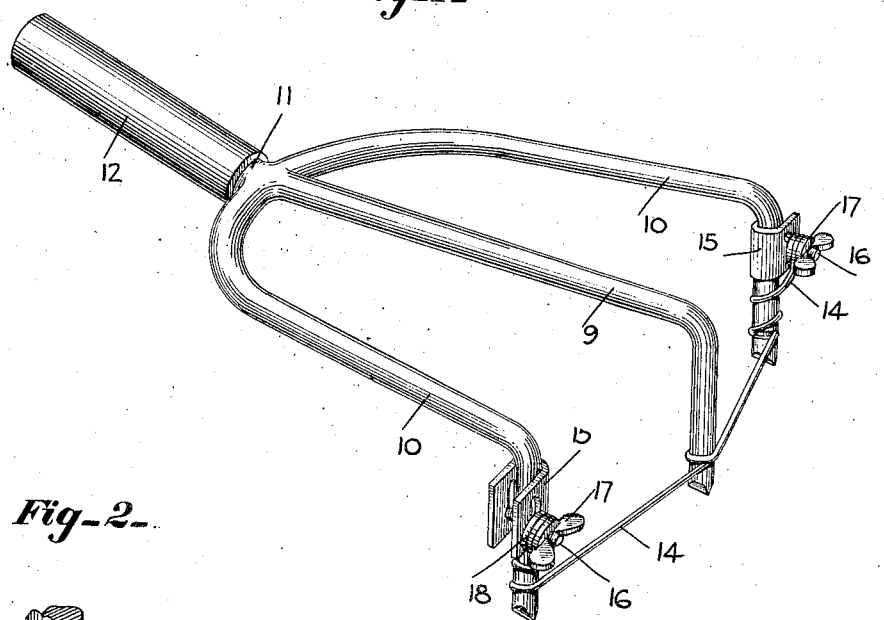
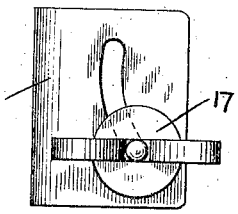
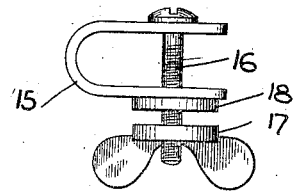
WITNESSES
Frank C. Palmer
INVENTOR
James Dickson
BY
ATTORNEYS

UNITED STATES PATENT OFFICE.

JAMES DICKSON, OF GODERICH, ONTARIO, CANADA.

GARDEN-RAKE.

1,050,721. Specification of Letters Patent. Patented Jan. 14, 1913.

Application filed May 27, 1912. Serial No. 699,919.

*To all whom it may concern:*

Be it known that I, JAMES DICKSON, a subject of the King of Great Britain, and a resident of Goderich, in the Province of Ontario and Dominion of Canada, have invented a new and Improved Garden-Rake, of which the following is a full, clear, and exact description.

Among the principal objects which the present invention has in view are: to provide an implement adapted to receive a temporary device to shatter or agitate the ground through which it is drawn; and to provide a simple and efficient means for securing the agitating device.

Reference is to be had to the accompanying drawings forming a part of this specification, in which similar characters of reference indicate corresponding parts in all the views, and in which—

Figure 1 is a perspective view of a rake constructed and arranged in accordance with the present invention; Fig. 2 is a detail view, on an enlarged scale, showing an end fragment of one of the tines with which the rake is provided; Fig. 3 is a detail view, on an enlarged scale, showing a side view of a holding clamp, with which the rake is provided; and Fig. 4 is a detail view on enlarged scale, showing the upper edge of the clamp for holding the temporary agitating member.

As seen in the accompanying drawings, a rake, having a central tine 9, is also provided with wide-spread tines 10. The tines are integrally attached to a tang 11, which is driven into the handle or haft 12. The tines 10 are initially set to flare from the tine 9. Each tine is provided with a vertically-disposed tooth section, constituting an agitating rake for gardening. These tooth sections are each provided adjacent the lower end with an annular groove 13. The grooves 13 are provided to receive a wire 14, which, when wrapped about said tooth sections of the tines 9 and 10, is used to draw said tines into closer relation. The outer tines 10 are contracted manually while the wire 14 is adjusted. Thereafter the spring of the tines 10 operates to hold the wire 14 taut.

Any suitable device for holding the wire 14 upon the tines may be employed. That shown in the drawings is preferred by me, and consists of a U-shaped clip adapted to surround the tines 10, and perforated at the straight sides to receive screws 16. Threaded upon each screw 16 is a wing nut 17. Between the body of the wing nut 17 and a washer 18, the free ends of the wire 14 are held. It is obvious that the washer 18, though convenient, is not essential to the operation of the clamp.

In the operation of the rake thus constructed and arranged, the two portions of the tines 9 and 10 are forced into the ground, the wire 14 offering little or no resistance to such action. Thereafter, as the rake is pulled through the ground, the wire 14, being disposed under the surface of the ground, serves to loosen or shatter the earth.

A rake of this character is used for keeping the surface earth surrounding plants in a loosened or shattered condition.

It is obvious that in the operation above described, the wire 14 is subjected to more or less wear, and that it is essential to the perfect operation of an implement of this character that the wire shall be replaced when worn out. This is accomplished by loosening the nuts 17 and removing the free ends of the wire 14 from engagement therewith, and subsequently unwrapping the wire from the engagement thereof with the grooves 13 of the tooth portions of the tines 9 and 10.

Having thus described my invention, I claim as new and desire to secure by Letters Patent:—

1. A garden rake, comprising a plurality of tines having bent tooth portions, said tines being normally flared; a suitable binding member adapted for attachment to each of said tines, adjacent the end thereof, to bridge the space between the ends of said tines to shatter the earth through which the implement is drawn; and means for removably securing said member upon the outer of said tines after the same have been contracted upon the intermediate tine, whereby a tension is maintained on said member.

2. A garden rake, comprising a plurality of integrally connected resilient normally flared tines having approximately perpendicularly-disposed tooth sections; a binding member attachable to each of said tines adjacent the lower end of the tooth sections thereof; and means for holding the free ends of said member in fixed relation to the outermost of said tines, said outermost tines being contracted before receiving the binding member, to produce a pulling strain on said binding member.

3. A garden rake, comprising a plurality of resilient tines integrally provided with a mounting tang, all of said tines having perpendicularly - disposed relatively parallel tooth sections adapted to form a rake, each of said tooth sections being provided adjacent the digging end thereof with an annular groove; a binding wire adapted for mounting on said tooth sections in said grooves; and clamps mounted on the outermost of said tines to hold the free ends of said wire.

In testimony whereof I have signed my name to this specification in the presence of two subscribing witnesses.

JAMES DICKSON.

Witnesses:
  GRACE S. DICKSON,
  HELEN DICKSON.